United States Patent
Yoshimura et al.

(10) Patent No.: US 9,508,507 B2
(45) Date of Patent: Nov. 29, 2016

(54) GAS INSULATED ELECTRICAL EQUIPMENT

(71) Applicant: MITSUBISHI ELECTRIC CORPORATION, Chiyoda-ku (JP)

(72) Inventors: Manabu Yoshimura, Chiyoda-ku (JP); Takashi Miyamoto, Chiyoda-ku (JP); Soichiro Kainaga, Chiyoda-ku (JP); Tsuyoshi Mori, Chiyoda-ku (JP); Hitoshi Sadakuni, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/437,932

(22) PCT Filed: Oct. 17, 2013

(86) PCT No.: PCT/JP2013/078172
§ 371 (c)(1),
(2) Date: Apr. 23, 2015

(87) PCT Pub. No.: WO2014/097729
PCT Pub. Date: Jun. 26, 2014

(65) Prior Publication Data
US 2015/0262773 A1   Sep. 17, 2015

(30) Foreign Application Priority Data

Dec. 21, 2012   (JP) .................. 2012-279657

(51) Int. Cl.
*H01H 33/02*   (2006.01)
*H01H 33/16*   (2006.01)
(Continued)

(52) U.S. Cl.
CPC ............... *H01H 33/02* (2013.01); *H01B 3/16* (2013.01); *H01H 33/161* (2013.01); *H01H 33/24* (2013.01);
(Continued)

(58) Field of Classification Search
CPC .... H01H 33/53; H01H 33/02; H01H 33/161; H01H 33/168; H01H 3/16; H01H 33/24; H02G 5/06; H02G 5/066; H02B 13/02; H02B 13/055; H02B 13/065; H01B 3/004
USPC ......... 218/155, 97, 77, 55–57; 361/604, 612
See application file for complete search history.

(56) References Cited

U.S. PATENT DOCUMENTS 3,345,450 A * 10/1967 Spindle ................ H01B 11/186
174/28
4,688,142 A *  8/1987 Hjortsberg ............ H02G 5/063
174/140 C (Continued)

FOREIGN PATENT DOCUMENTS

CN   1072536 A   5/1993
CN   1897277 A   1/2007

(Continued)

OTHER PUBLICATIONS

Machine translation JPH0530626 (Original doc. published Feb. 5, 1993).*

(Continued)

*Primary Examiner* — Renee S Luebke
*Assistant Examiner* — William Bolton
(74) *Attorney, Agent, or Firm* — Oblon, McClelland, Maier & Neustadt, L.L.P.

(57) ABSTRACT

Gas insulated electrical equipment includes: a metal enclosure having an insulating gas introduced therein; a conductor that is accommodated inside the metal enclosure and to which voltage is applied; and an insulating and supporting member insulating and supporting the conductor relative to the metal enclosure. The conductor is circumferentially covered with a dielectric film, and furthermore, a nonlinear resistance film provided on the dielectric film and having a nonlinear volume resistivity decreasing when the nonlinear resistance film is acted on by an electric field higher than a critical value.

6 Claims, 6 Drawing Sheets

(51) Int. Cl.
*H01H 33/24* (2006.01)
*H01H 33/53* (2006.01)
*H02B 13/065* (2006.01)
*H01B 3/00* (2006.01)
*H02G 5/06* (2006.01)
*H01B 3/16* (2006.01)

(52) U.S. Cl.
CPC .............. *H02B 13/065* (2013.01); *H02G 5/06* (2013.01); *H01B 3/004* (2013.01); *H01H 33/168* (2013.01); *H01H 33/53* (2013.01); *H01H 2223/002* (2013.01); *H01H 2223/008* (2013.01); *H01H 2239/044* (2013.01)

(56) References Cited

U.S. PATENT DOCUMENTS 6,002,085 A * 12/1999 Utsumi ................. H02G 5/068
174/28

7,742,283 B2 * 6/2010 Hama ..................... H01H 33/24
361/619

FOREIGN PATENT DOCUMENTS

| JP | 2 79711 | 3/1990 |
| JP | 5 30626 | 2/1993 |
| JP | 2009 284651 | 12/2009 |
| JP | 2010 207047 | 9/2010 |
| WO | 2010 100818 | 9/2010 |
| WO | 2012 137444 | 10/2012 |

OTHER PUBLICATIONS

International Search Report Issued Jan. 7, 2014 in PCT/JP2013/078172 Filed Oct. 17, 2013.

Office Action mailed Sep. 5, 2016 in Chinese Application No. 201380066313.0.

* cited by examiner

GAS INSULATED ELECTRICAL EQUIPMENT

TECHNICAL FIELD

The present invention relates to gas insulated electrical equipment and more specifically to gas insulated electrical equipment to which high voltage is applied.

BACKGROUND ART

Gas insulated electrical equipment has a cylindrical metal enclosure with a cylindrical high voltage conductor disposed therein such that it is coaxial with the metal enclosure. The metal enclosure has an insulating gas introduced therein. The insulating gas is mainly $SF_6$ gas, dry air, nitrogen gas, carbonic acid gas, $CF_4$ gas, $CHI_5$ gas, $C_2F_6$ gas, $C_3F_8$ gas and/or the like singly or mixed together.

In particular, $SF_6$ gas has a dielectric strength about 3 times that of air, and accordingly, it is used as an insulating gas allowing the equipment to have a high voltage unit and a ground electrode with a reduced distance therebetween to miniaturize the equipment.

The gas insulated electrical equipment typically has the insulating gas compressed and thus used for enhanced insulation. In order to ensure a fixed distance to the high voltage conductor for insulation while sealing the insulating gas, the gas insulated electrical equipment is structured to have the cylindrical high voltage conductor in the cylindrical metal enclosure coaxially, as described above.

When the insulating gas is $SF_6$ gas, it is necessary to consider that its insulation property may be impaired in an unbalanced electric field. For example, if the gas insulated electrical equipment is a switch, a metallic particle of a size of the millimeter level may be generated from those portions of metals which slide on each other, and those portions of conductors of a breaker, a disconnecting switch or the like.

When the metallic particle is generated, then, in an initial stage, the metallic particle deposits on the bottom of the metal enclosure. The metallic particle is acted on by static induction or the like and thus gradually, electrically charged, and the metallic particle starts to reciprocate such that it repeatedly ascends from and descends to the bottom of the metal enclosure in accordance with an electric potential gradient provided between the metal enclosure and the high voltage conductor while the gas insulated electrical equipment is in operation.

While the metallic particle is electrically less charged, the metallic particle reciprocates in a vicinity of the bottom of the metal enclosure, however, as the metallic particle is increasingly, electrically charged, the metallic particle ascends to higher levels and thus comes close to or into contact with the high voltage conductor.

In a vicinity of the high voltage conductor, there is a highest electric field. Accordingly, when the metallic particle approaches the high voltage conductor, an electric field concentration is caused in a vicinity of the metallic particle, which results in an unbalanced electric field distribution and causes an electric discharge. When the electric discharge is caused, a flashover may be caused via the metallic particle and result in destroying the entire circuitry.

Flashover via a metallic particle can be minimized by configurations disclosed in prior art documents including Japanese Patent Laying-Open No. 2009-284651 (PTD 1) and Japanese Patent Laying-Open No. 5-30626 (PTD 2).

PTD 1 describes a sealed insulation device including a metal enclosure having an internal surface provided with a nonlinear resistance film that is provided to be high in electric resistance when the metal enclosure's internal surface is acted on by an electric field having a critical value or lower and to be low in electric resistance when the metal enclosure's internal surface is acted on by an electric field higher than the critical value.

PTD 2 describes a composite insulated bus including a high voltage conductor and a metal enclosure having an external surface and an internal surface, respectively, coated with a fluororesin coating of 10 mm or larger in thickness.

CITATION LIST

Patent Documents

PTD 1: Japanese Patent Laying-Open No. 2009-284651
PTD 2: Japanese Patent Laying-Open No. 5-30626

SUMMARY OF INVENTION

Technical Problem

The sealed insulation device described in PTD 1 can restrict the behavior of the metallic particle when it is located in a vicinity of the bottom of the metal enclosure, however, the sealed insulation device cannot restrict the behavior of the metallic particle when it ascends to a vicinity of the high voltage conductor. Accordingly, there is a room for reducing the electric discharge that is caused via the metallic particle for more reliable insulation.

The composite insulated bus described in PTD 2 is implemented with the fluororesin coating implemented by polytetrafluoroethylene (PTFE), perfluoro alkoxy fluororesin (PFA), a fluorinated-ethylene propylene copolymer (FEP) or a similar film of 10 mm or larger.

The PTFE film is provided by baking powdery PTFE on a metallic conductor, for example. Employing this method to provide the film with a thickness of 10 mm or larger involves spraying and thus applying at least several to several tens of layers. This complicates film quality management such as preventing metallic particles from entering the film, controlling the film in thickness, and the like, and also entails an increased production time.

The PFA film or the FEP film is provided by injection molding or transfer molding, for example. This method, however, requires a mold, resulting in a complicated production process.

The present invention has been made in view of the above issue, and contemplates gas insulated electrical equipment that can be easily produced and minimize an electric discharge that is caused by a metallic particle to achieve more reliable insulation.

Solution to Problem

The present invention provides gas insulated electrical equipment comprising: a metal enclosure having an insulating gas introduced therein; a conductor that is accommodated inside the metal enclosure and to which voltage is applied; and an insulating and supporting member insulating and supporting the conductor relative to the metal enclosure. The conductor is circumferentially covered with a dielectric film, and furthermore, a nonlinear resistance film provided on the dielectric film and having a nonlinear volume resistivity decreasing when the nonlinear resistance film is acted on by an electric field higher than a critical value.

Advantageous Effect of Invention

The present invention thus allows gas insulated electrical equipment to be easily produced that can minimize an electric discharge that is caused by a metallic particle to achieve more reliable insulation.

DESCRIPTION OF EMBODIMENTS

Hereinafter reference will be made to the drawings to describe gas insulated electrical equipment according to a first embodiment of the present invention. In describing the following embodiments with reference to the figures, identical or corresponding components are identically denoted and will not be described repeatedly.

First Embodiment

Figure 1:
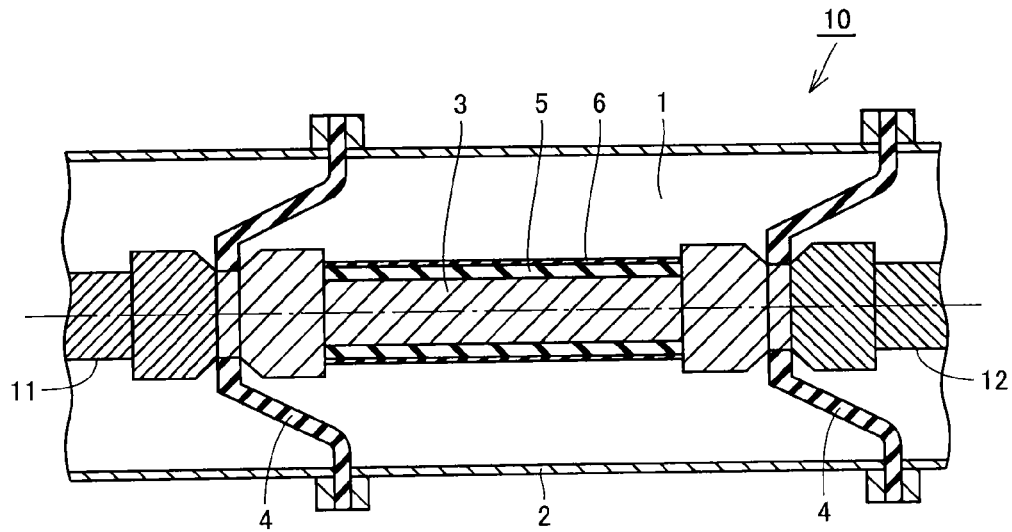
FIG. 1 is a cross section in configuration of gas insulated electrical equipment according to a first embodiment of the present invention.

FIG. 1 is a cross section in configuration of gas insulated electrical equipment according to the first embodiment of the present invention. As shown in FIG. 1, the present invention in the first embodiment provides gas insulated electrical equipment 10 including a metal enclosure 2 having an insulating gas 1 introduced therein, a conductor 3 that is accommodated inside metal enclosure 2 and to which voltage is applied, and an insulating and supporting member 4 insulating and supporting conductor 3 relative to metal enclosure 2.

In the present embodiment, gas insulated electrical equipment 10 is connected such that it is sandwiched between a circuit breaker located leftward in FIG. 1 and a disconnecting switch located rightward in FIG. 1.

Metal enclosure 2 is cylindrical in geometry, and is grounded and thus fixed to a ground potential. Metal enclosure 2 axially has opposite ends each with a joint. The joint of metal enclosure 2 that is closer to the circuit breaker is connected to a joint of a metal enclosure of the circuit breaker, with insulating and supporting member 4 posed therebetween. The joint of metal enclosure 2 that is closer to the disconnecting switch is connected to a joint of a metal enclosure of the disconnecting switch, with another insulating and supporting member 4 posed therebetween.

Conductor 3 is disposed to be coaxial with metal enclosure 2. More specifically, conductor 3 is generally cylindrically provided to extend along a center axis of metal enclosure 2. Conductor 3 is positioned by insulating and supporting member 4.

Conductor 3 axially has opposite ends each with a coupling portion. Conductor 3 has the coupling portion covered with an electric field alleviation shield (not shown). The coupling portion of conductor 3 that is closer to the circuit breaker is coupled with a coupling portion of a conductor 11 of the circuit breaker. The coupling portion of conductor 3 that is closer to the disconnecting switch is coupled with a coupling portion of a conductor 12 of the disconnecting switch.

Insulating and supporting member 4, as seen along conductor 3, has one side with a projecting surface and the other side with a recessed surface. Furthermore, insulating and supporting member 4 as seen radially has an end with a flat portion. Furthermore, insulating and supporting member 4 has a center with an opening.

Insulating and supporting member 4 has the flat portion sandwiched between the joint of metal enclosure 2 and the joint of the metal enclosure of the circuit breaker or the joint of the metal enclosure of the disconnecting switch. This secures insulating and supporting member 4 to metal enclosure 2. Insulating and supporting member 4 is formed of a solid insulator.

Insulating and supporting member 4 has the opening fitted with the coupling portion of conductor 3. Insulating and supporting member 4 thus supports conductor 3. Insulating and supporting member 4 has the opening sealed by conductor 3. Insulating gas 1 is sealed in a space surrounded by metal enclosure 2, insulating and supporting member 4, and conductor 3.

Hereinafter, conductor 3 will be described more specifically.

As shown in FIG. 1, conductor 3 is circumferentially covered with a dielectric film 5 and a nonlinear resistance film 6 provided on dielectric film 5 and having a nonlinear electric resistance decreasing when nonlinear resistance film 6 is acted on by an electric field higher than a critical value. Nonlinear resistance film 6 is smaller in thickness than dielectric film 5.

In the present embodiment, conductor 3 only at a portion thereof sandwiched between the opposite coupling portions is provided with dielectric film 5 and nonlinear resistance film 6. Note that, as has been previously described, conductor 3 has the coupling portions covered with the electric field alleviation shield.

The electric field alleviation shield includes a metallic base material and an insulating portion provided on a surface of the base material. The insulating portion is configured for example of insulating paper, or insulator such as epoxy resin, fluororesin or similar insulating coating.

While in the present embodiment dielectric film 5 is epoxy resin, dielectric film 5 is not limited thereto, and it may be fluororesin, ceramic resin, rubber or the like. While dielectric film 5 may be about tens of μm or larger and about hundreds of μm or smaller in thickness, it may also be about several millimeters in thickness.

Dielectric film 5 is formed of epoxy resin by powder coating, dipping in liquid, injection-molding using a die, or the like, for example. When dielectric film 5 is formed of fluororesin, it is provided by powder baking, injection molding, transfer molding, or the like. When dielectric film 5 is formed of rubber, it is provided by covering with a heat shrinkable tube, liquid coating, injection molding, or the like.

Dielectric film 5 allows conductor 3 to be enhanced in withstand voltage. This is done through a mechanism, as follows: When conductor 3 is uncovered, it has a surface with fine depression and projection having a difference in level of approximately several μm to several tens of μm. In a vicinity of the fine depression and projection, there is an enhanced electric field.

When a macroscopic breakdown electric field without the surface's fine depression and projection taken into consideration is evaluated, the breakdown electric field is observed to be lowered as an electrode increases in area, i.e., a so-called area effect of the electrode is observed. This phenomenon has a significant effect on conductor 3 in withstand voltage. In particular, when conductor 3 has the surface with the fine depression and projection exposed, an enhanced electric field is provided and the area effect has a significant effect.

Conductor 3 provided with dielectric film 5 can have the surface with the fine depression and projection smoothed to alleviate the electric field otherwise enhanced by the fine depression and projection. As a result, the area effect can be reduced and conductor 3 can be enhanced in withstand voltage.

While in the present embodiment nonlinear resistance film 6 includes a nonlinear resistance material of ZnO, the nonlinear resistance material is not limited thereto, and may for example be SiC, MgO, ZnSe, CdTe, AlGa, InP, GaAs, InSb, GaP, GaN, AlP, InN, InAs, NaCl, AgBr, CuCl or the like.

Nonlinear resistance film 6 is provided for example as follows: The nonlinear resistance material is mixed into a binder resin used to provide the film and the mixture is applied and set at a room temperature or as it is heated. The mixture is applied for example by roller coating, spray gun coating, baked coating, dip coating or the like.

The binder resin can for example be epoxy resin or the like. In the present embodiment, the binder resin of nonlinear resistance film 6 has a major component identical to that of dielectric film 5. Note, however, that the major component of the binder resin of nonlinear resistance film 6 is not limited to epoxy resin, and it may be phenol resin or the like.

Nonlinear resistance film 6 is characterized in varying in volume resistivity with an electric field nonlinearly. More specifically, nonlinear resistance film 6 is held high in volume resistivity when nonlinear resistance film 6 is acted on by an electric field equal to or lower than a critical value. Nonlinear resistance film 6 decreases in volume resistivity when nonlinear resistance film 6 is acted on by an electric field higher than the critical value.

As will more specifically be described hereinafter, in the present embodiment, nonlinear resistance film 6 is provided such that it is constant in volume resistivity in an electric field equal to or lower than a testing electric field and decreases in volume resistivity in an electric field higher than the testing electric field, the testing electric field being an electric field acting on nonlinear resistance film 6 when a test voltage is applied to confirm whether metal enclosure 2 has any metallic particle therein. In other words, the testing electric field is set as the above described critical value.

Nonlinear resistance film 6 can be modified in volume resistivity simply by modifying the nonlinear resistance material that is in the form of powder in particle diameter and/or modifying a ratio of blending the nonlinear resistance material and the binder resin.

A phenomenon that may arise when gas insulated electrical equipment 10 has a metallic particle therein will now be described.

Figure 2:
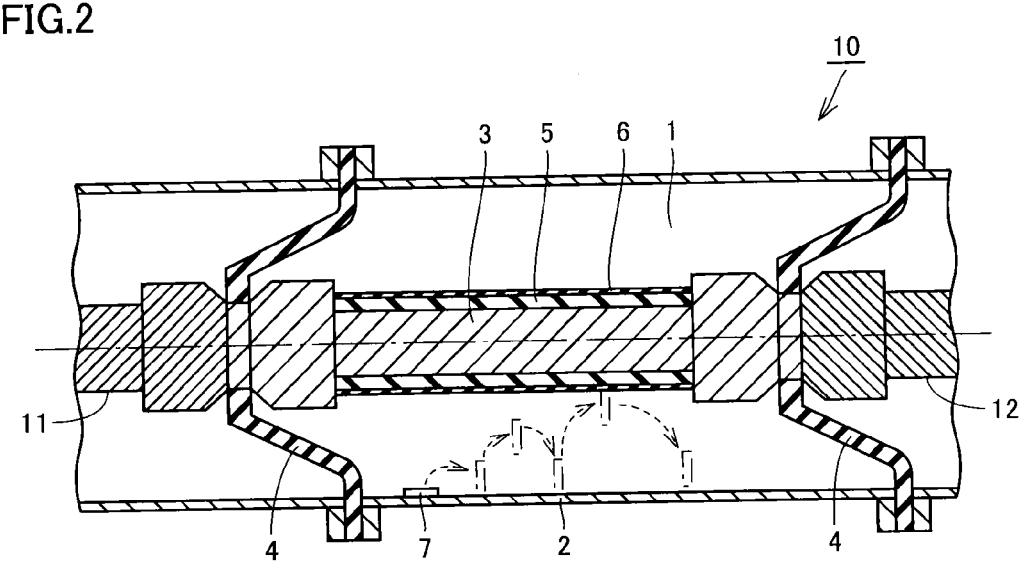
FIG. 2 is a cross section of the gas insulated electrical equipment to show how a metallic particle behaves therein.

FIG. 2 is a cross section of the gas insulated electrical equipment to show how a metallic particle behaves therein. As has previously been described, conductor 3 is coupled at the coupling portion with conductor 11 of the circuit breaker or conductor 12 of the disconnecting switch. The coupled portions have metal members in contact with each other, and there may be generated a metallic particle formed of a piece of metal exfoliated from the metal member(s).

As shown in FIG. 2, when voltage is not applied to conductor 3, metallic particle 7 deposits on the bottom of metal enclosure 2 by gravity. Once voltage is applied to conductor 3, an electric charge is supplied from metal enclosure 2 to metallic particle 7 by electrostatic induction or the like.

Metallic particle 7 having received the electric charge and thus electrically charged receives Coulomb force attributed to an electric field that surrounds metallic particle 7, and metallic particle 7 will thus ascend and descend repeatedly and thus move upwards and downwards. When metallic particle 7 is electrically charged in a large amount, metallic particle 7 can ascend close to or come in contact with conductor 3. When metallic particle 7 approaches conductor 3, an electric field concentration occurs at a tip of metallic particle 7 that is closer to conductor 3.

If conductor 3 should not be covered, and the electric field concentrating at the tip of metallic particle 7 that is closer to conductor 3 exceeds an electric field allowing ionization of insulating gas 1, a partial discharge arises between conductor 3 and metallic particle 7. Once this partial discharge has arisen, an electric field concentration will also occur at a tip of metallic particle 7 that is closer to metal enclosure 2. If the electric field concentrating at the tip of metallic particle 7 that is closer to metal enclosure 2 exceeds an electric field allowing ionization of insulating gas 1, an electric discharge arises between metal enclosure 2 and metallic particle 7 and may result in a flashover.

To address this, the present embodiment provides gas insulated electrical equipment 10 having conductor 3 covered with dielectric film 5 and nonlinear resistance film 6.

Figure 3:
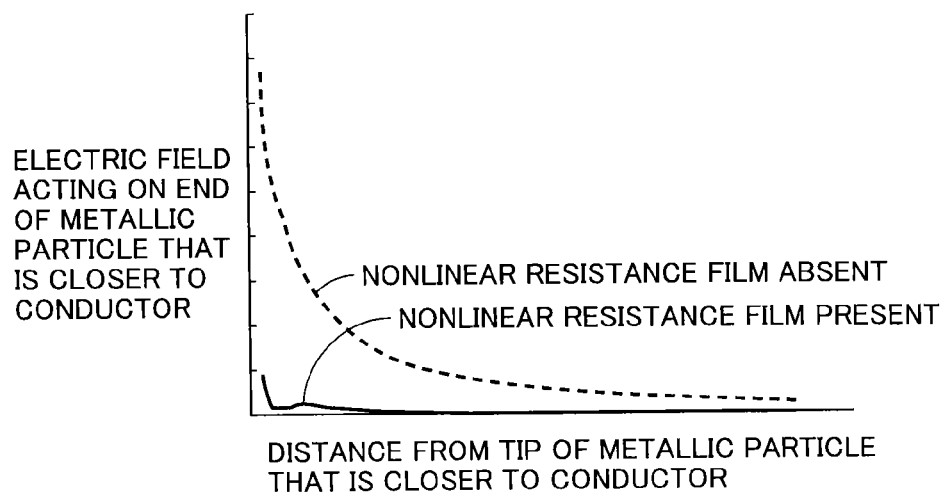
FIG. 3 is a graph representing an electric field distribution around a virtual metallic particle close to a conductor at an end of the virtual metallic particle that is closer to the conductor.

Hereafter will be described a result of an investigation of one example of metallic particle 7 that is a virtual metallic particle generally cylindrical in geometry with hemispherical opposite ends. FIG. 3 is a graph representing an electric field distribution around a virtual metallic particle close to a conductor at an end of the virtual metallic particle that is closer to the conductor. The FIG. 3 graph has an axis of ordinate representing an electric field acting on the end of the virtual metallic particle that is closer to conductor 3, and an axis of abscissa representing a distance from a tip of the virtual metallic particle that is closer to conductor 3 in a circumferential direction of the end of the virtual metallic particle that is closer to conductor 3 in a longitudinal cross section of the virtual metallic particle. Furthermore, in FIG. 3, a solid line represents data obtained when nonlinear resistance film 6 is provided, and a dotted line represents data obtained when nonlinear resistance film 6 is not provided and dielectric film 5 is alone provided.

As shown in FIG. 3, nonlinear resistance film 6 allows alleviation of an electric field concentrating at the tip of the virtual metallic particle that is closer to conductor 3. More specifically, when the virtual metallic particle approaches conductor 3 and an electric field concentration occurs at the tip of the virtual metallic particle that is closer to conductor 3, nonlinear resistance film 6 is acted on by an electric field higher than a critical value, and nonlinear resistance film 6 is thus decreased in volume resistivity. As a result, the electric field concentrating at the tip of the virtual metallic particle that is closer to conductor 3 can be alleviated, and a partial electric discharge that would otherwise arise between conductor 3 and the virtual metallic particle can thus be prevented.

Figure 4:
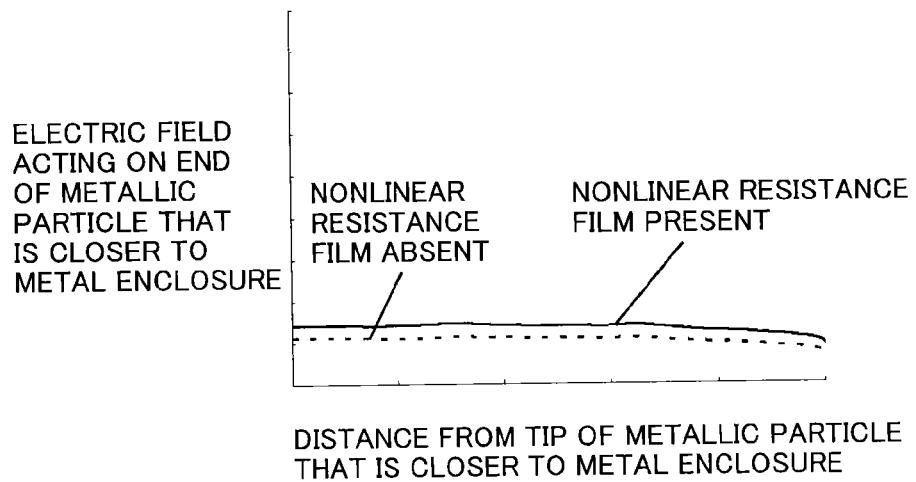
FIG. 4 is a graph representing an electric field distribution around a virtual metallic particle close to a conductor at a tip of the virtual metallic particle that is closer to the metal enclosure.

FIG. 4 is a graph representing an electric field distribution around a virtual metallic particle close to a conductor at a tip of the virtual metallic particle that is closer to the metal enclosure. The FIG. 4 graph has an axis of ordinate representing an electric field acting on an end of the virtual metallic particle that is closer to the metal enclosure, and an axis of abscissa representing a distance from a tip of the virtual metallic particle that is closer to the metal enclosure in a circumferential direction of the end of the virtual metallic particle that is closer to the metal enclosure in a longitudinal cross section of the virtual metallic particle. Furthermore, in FIG. 4, a solid line represents data obtained when nonlinear resistance film 6 is provided, and a dotted line represents data obtained when nonlinear resistance film 6 is not provided and dielectric film 5 is alone provided.

As shown in FIG. 3 and FIG. 4, when nonlinear resistance film 6 is not provided and dielectric film 5 is alone provided, and the virtual metallic particle approaches conductor 3, an electrical field in a vicinity of the tip of the virtual metallic particle that is closer to metal enclosure 2 is lower than an electrical field in a vicinity of the tip of the virtual metallic particle that is closer to conductor 3, and the former is lower than the critical value. Accordingly, as shown in FIG. 4, the case with nonlinear resistance film 6 and that without nonlinear resistance film 6 do not have a significant difference in what electric field distribution is provided around the virtual metallic particle in a vicinity of conductor 3 at the tip of the virtual metallic particle that is closer to metal enclosure 2.

In the present embodiment, dielectric film 5 is provided inner than nonlinear resistance film 6. When nonlinear resistance film 6 is decreased in volume resistivity, and metallic particle 7 comes into contact with nonlinear resistance film 6, dielectric film 5 that exists between metallic particle 7 and conductor 3 can prevent metallic particle 7 from being equal in potential to conductor 3. This can prevent an electric field from concentrating at the tip of metallic particle 7 that is closer to metal enclosure 2, and can prevent an electric discharge from arising between metal enclosure 2 and metallic particle 7 and resulting in a flashover.

Figure 5:
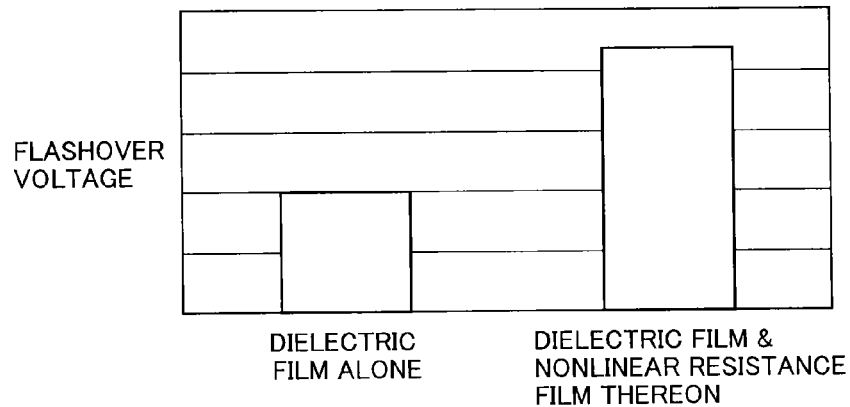
FIG. 5 is a graph representing a flashover voltage provided when the conductor is provided thereon with a dielectric film alone, and a flashover voltage provided when the conductor is provided thereon with a dielectric film and a nonlinear resistance film.

FIG. 5 is a graph representing a flashover voltage provided when the conductor is only provided with a dielectric film thereon, and a flashover voltage provided when the conductor is provided with a dielectric film and a nonlinear resistance film thereon. As shown in FIG. 5, when providing conductor 3 with dielectric film 5 thereon and nonlinear resistance film 6 on dielectric film 5 is compared with providing conductor 3 with dielectric film 5 alone, the former allows gas insulated electrical equipment 10 to have higher flashover voltage than the latter.

Furthermore, configuring dielectric film 5 of a material of large dielectric strength can increase a flashover voltage reaching a flashover, and thus prevent destruction of the entire circuitry if overvoltage such as a lightning surge rushes in.

In the present embodiment, nonlinear resistance film 6 is smaller in thickness than dielectric film 5, as has been set forth above. Nonlinear resistance film 6 contains a semiconducting, nonlinear resistance material, and accordingly, nonlinear resistance film 6 is higher in dielectric constant than dielectric film 5. Accordingly, when voltage is applied to conductor 3, an electric field will concentrate more at dielectric film 5 than nonlinear resistance film 6. This phenomenon is more significant for nonlinear resistance film 6 larger in thickness.

Furthermore, in the present embodiment, nonlinear resistance film 6 has a dimension in thickness to be smaller than a distance from the internal surface of metal enclosure 2 to the surface of nonlinear resistance film 6.

Figure 6:
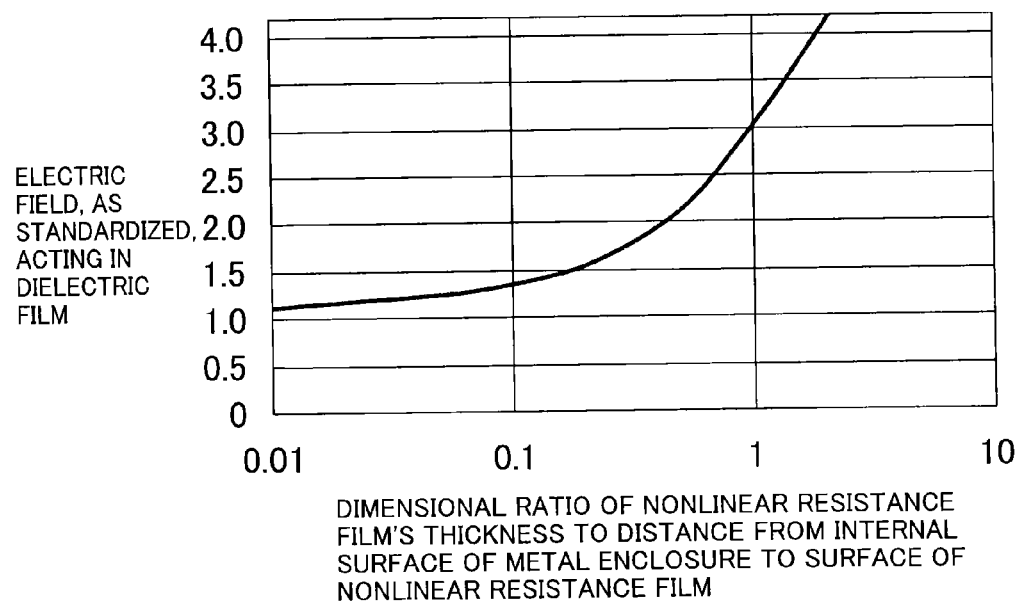
FIG. 6 is a graph showing a result of an investigation of a correlation between an electric field acting in a dielectric film and a dimensional ratio of a nonlinear resistance film's thickness to a distance from an internal surface of the metal enclosure to a surface of the nonlinear resistance film, without the nonlinear resistance film decreased in volume resistivity.

FIG. 6 is a graph showing a result of an investigation of a correlation between an electric field acting in the dielectric film and a dimensional ratio of the nonlinear resistance film's thickness to the distance from the internal surface of the metal enclosure to the surface of the nonlinear resistance film, without the nonlinear resistance film decreased in volume resistivity. The FIG. 8 graph has an axis of ordinate representing an electric field acting in dielectric film 5, and an axis of abscissa representing the dimensional ratio. Note that the electric field acting on dielectric film 5 is standardized by an electric field acting in dielectric film 5 when the dimensional ratio is 0.01.

As shown in FIG. 6, when the dimensional ratio is larger than 1, the electric field acting in dielectric film 5 rapidly becomes high. Accordingly, the dimensional ratio can be set to 1 or smaller to reduce the electric field acting in dielectric film 5. In other words, nonlinear resistance film 6 having a dimension in thickness smaller than the distance from the internal surface of metal enclosure 2 to the surface of nonlinear resistance film 6 allows reduction of the electric field acting in dielectric film 5. In particular, a dimensional ratio of 0.1 or smaller allows an electric field to be alleviated steadily and significantly effectively. Accordingly, nonlinear resistance film 6 preferably has a dimension in thickness of 1/10 of the distance from the internal surface of metal enclosure 2 to the surface of nonlinear resistance film 6 or smaller.

When an electric field concentrates at dielectric film 5, dielectric film 5 may experience electrical stress and be degraded. If dielectric film 5 should be degraded, and metallic particle 7 comes in contact with conductor 3 indirectly, metallic particle 7 has a potential increased closer to that of conductor 3, which facilities causing an electric discharge between metal enclosure 2 and metallic particle 7.

Furthermore, when an electric field concentrates at dielectric film 5, an electric field adjacent to an external surface of nonlinear resistance film 6 is intensified. When nonlinear resistance film 6 is acted on by an electric field higher than the critical value, nonlinear resistance film 6 decreases in volume resistivity. If in this condition dielectric film 5 is degraded, it further facilitates causing an electric discharge between metal enclosure 2 and metallic particle 7.

Accordingly, in the present embodiment, nonlinear resistance film 6 is smaller in thinness than dielectric film 5 to alleviate an electric field in dielectric film 5. As a result, an electric field adjacent to the external surface of nonlinear resistance film 6 can be weakened to minimize an electric discharge that is caused between metal enclosure 2 and metallic particle 7 and hence allow gas insulated electrical equipment 10 to achieve more reliable insulation.

Figure 7:
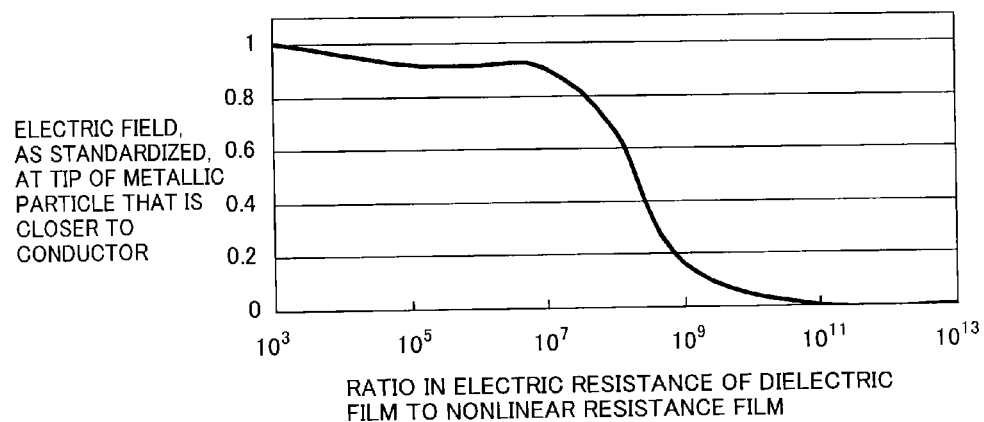
FIG. 7 is a graph showing a result of an investigation of a correlation, as observed with a metallic particle in contact with a conductor, between an electric field at a tip of the metallic particle that is closer to the conductor and a ratio in electric resistance of the dielectric film to the nonlinear resistance film.

FIG. 7 is a graph showing a result of an investigation of a correlation, as observed with a metallic particle in contact with the conductor, between an electric field at the tip of the metallic particle that is closer to the conductor and a ratio in electric resistance of the dielectric film to the nonlinear resistance film. The FIG. 7 graph has an axis of ordinate representing the electric field at the tip of the metallic particle that is closer to the conductor, and an axis of abscissa representing the resistance ratio. Note that the electric field at the tip of the metallic particle that is closer to the conductor is standardized by an electric field obtained when the resistance ratio is $10^3$. As shown in FIG. 7, when the resistance ratio is larger than $10^7$, the electric field at the tip of metallic particle 7 that is closer to conductor 5 is significantly effectively alleviated.

Figure 8:
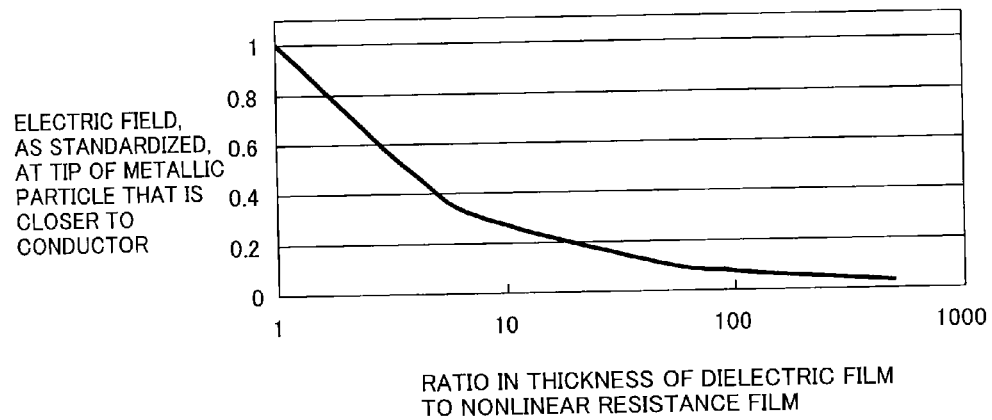
FIG. 8 is a graph showing a result of an investigation of a correlation, as observed with the metallic particle in contact with the conductor, between the electric field at the tip of the metallic particle that is closer to the conductor and a ratio in thickness of the dielectric film to the nonlinear resistance film.

FIG. 8 is a graph showing a result of an investigation of a correlation, as observed with the metallic particle in contact with the conductor, between the electric field at the tip of the metallic particle that is closer to the conductor and a ratio in thickness of the dielectric film to the nonlinear resistance film. The FIG. 8 graph has an axis of ordinate representing the electric field at the tip of the metallic particle that is closer to the conductor, and an axis of abscissa representing the thickness ratio. Note that the electric field at the tip of the metallic particle that is closer to the conductor is standardized by an electric field obtained when the thickness ratio is 1. When the thickness ratio is 1, the resistance ratio is $10^8$.

As shown in FIG. 8, as the thickness ratio increases, the electric field at the tip of metallic particle 7 that is closer to conductor 5 is more alleviated. In other words, the smaller in thickness nonlinear resistance film 6 is than dielectric film 5, the more the electric field at the tip of metallic particle 7 that is closer to conductor 5 is alleviated.

In the present embodiment, as has been described above, nonlinear resistance film 6 is provided such that it is constant in volume resistivity in an electric field equal to or lower than a testing electric field and decreases in volume resistivity in an electric field higher than the testing electric field, the testing electric field being an electric field acting on nonlinear resistance film 6 when a test voltage is applied to confirm whether metal enclosure 2 has any metallic particle 7 therein.

Figure 9:
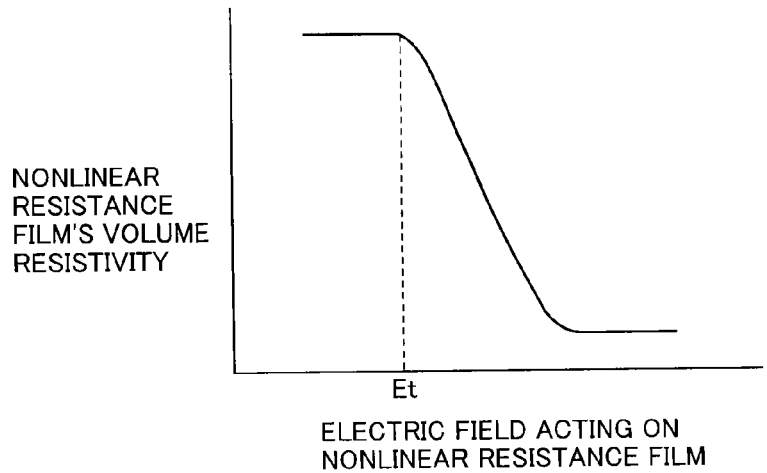
FIG. 9 is a graph of the nonlinear resistance film in volume resistivity versus an electric field acting on the nonlinear resistance film according to the present embodiment.

FIG. 9 is a graph of the nonlinear resistance film in volume resistivity versus an electric field acting on the nonlinear resistance film according to the present embodiment. The FIG. 9 graph has an axis of ordinate representing the nonlinear resistance film in volume resistivity, and an axis of abscissa representing the electric field acting on the nonlinear resistance film.

As shown in FIG. 9, nonlinear resistance film 6 is constant in volume resistivity for a testing electric field $E_t$ or lower, testing electric field $E_t$ being an electric field acting on nonlinear resistance film 6 in a type approval test conducted with a voltage of a commercial frequency. Accordingly, for voltages lower than that of the type approval test, i.e., when a lightning impulse or a switching impulse is caused or in an electric field acting on nonlinear resistance film 6 via a voltage applied in a normal operation, nonlinear resistance film 6 has a large fixed value in volume resistivity. Nonlinear resistance film 6 in an electric field higher than testing electric field $E_t$ decreases in volume resistivity as the electric field increases, and thereafter, nonlinear resistance film 6 has a constantly small value in volume resistivity while the electric field further increases.

As has been previously described, when metallic particle 7 approaches conductor 3 and an electric field concentration occurs at the tip of metallic particle 7 that is closer to conductor 3, nonlinear resistance film 6 is acted on by an electric field higher than testing electric field $E_t$, and nonlinear resistance film 6 decreases in volume resistivity. Nonlinear resistance film 6 thus allows alleviation of the electric field concentrating at the tip of metallic particle 7 that is closer to conductor 3, and can thus prevent a partial electric discharge that would otherwise arise between conductor 3 and metallic particle 7.

Furthermore, when metallic particle 7 is not close to conductor 3, nonlinear resistance film 6 in a normal operation or a withstand voltage test is acted on by an electric field equal to or lower than testing electric field $E_t$, and nonlinear resistance film 6 is thus held high in volume resistivity. Thus an electric field adjacent to the external surface of nonlinear resistance film 6 and an electric field in dielectric film 5 can be prevented from being intensified. As a result, conductor 3's flashover voltage can be increased to allow gas insulated electrical equipment 10 to achieve more reliable insulation.

In the present embodiment, as has been set forth above, the binder resin of nonlinear resistance film 6 has a major component identical to that of dielectric film 5. This allows dielectric film 5 and nonlinear resistance film 6 to have close coefficients of linear expansion, respectively, to thus prevent gas insulated electrical equipment 10 in operation from having a heat cycle to peel off dielectric film 5 and nonlinear resistance film 6 at their interface.

In the present embodiment dielectric film 5 of at most several mm in thickness and nonlinear resistance film 6 smaller in thickness than dielectric film 5 suffice, which allows the films to be deposited in a shorter period of time and gas insulated electrical equipment 10 to be produced in a shorter period of time than depositing a film of 10 mm or larger in thickness as conventional does. Furthermore, film quality management such as preventing metallic particles from entering the films, controlling the films in thickness, and the like, can be simplified. Furthermore, the films can be deposited without using a die and instead by powder coating, covering with a heat shrinkable tube, or the like to simplify the production process. The present embodiment can thus provide gas insulated electrical equipment 10 that can be easily produced and minimize an electric discharge that is caused by a metallic particle to achieve more reliable insulation.

The present invention in a second embodiment provides gas insulated electrical equipment, as will be described hereinafter with reference to the figures. Note that the present embodiment provides gas insulated electrical equipment 20 that differs from gas insulated electrical equipment 10 of the first embodiment only in that the former has metal enclosure 2 having an internal circumference provided with a dielectric film 8 and a nonlinear resistance film 9, and gas insulated electrical equipment 20 will not be described for the remainder in configuration.

Second Embodiment

Figure 10:
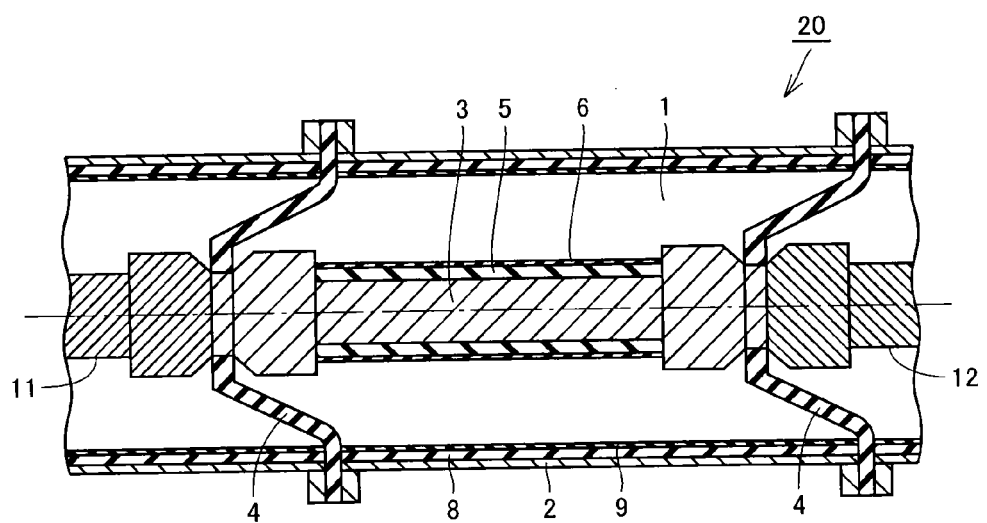
FIG. 10 is a cross section in configuration of gas insulated electrical equipment according to a second embodiment of the present invention.

FIG. 10 is a cross section in configuration of gas insulated electrical equipment according to the second embodiment of the present invention. As shown in FIG. 10, the present invention in the second embodiment provides gas insulated electrical equipment 20 having metal enclosure 2 having an internal circumference covered with dielectric film 8 and nonlinear resistance film 9 provided on dielectric film 8 and having a nonlinear electric resistance decreasing when nonlinear resistance film 9 is acted on by an electric field higher than a critical value.

Figure 11:
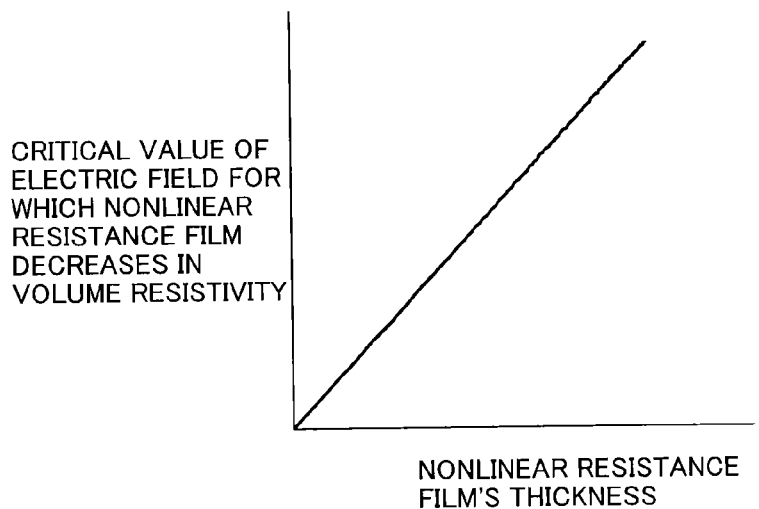
FIG. 11 is a graph of a critical value of an electric field for which the nonlinear resistance film decreases in volume resistivity versus the nonlinear resistance film in thickness.

Dielectric film 8 is deposited similarly as dielectric film 5 of the first embodiment is deposited. Nonlinear resistance film 9 is deposited similarly as nonlinear resistance film 6 of the first embodiment is deposited. Note, however, that nonlinear resistance film 9 is smaller in thickness than nonlinear resistance film 6. This is done for the ground described below:

FIG. 11 is a graph of a critical value of an electric field for which the nonlinear resistance film decreases in volume resistivity versus the nonlinear resistance film in thickness. The FIG. 11 graph has an axis of ordinate representing the critical value of the electric field for which the nonlinear resistance film decreases in volume resistivity, and an axis of abscissa representing the nonlinear resistance film in thickness.

As shown in FIG. 11, the larger the nonlinear resistance film is in thickness, the larger the critical value of the electric field for which the nonlinear resistance film decreases in volume resistivity is. In gas insulated electrical equipment 20, an electric field around metal enclosure 2 is lower than an electric field around conductor 3. For example, the electric field around conductor 3 is about 3 times that around metal enclosure 2. Accordingly, nonlinear resistance film 9 is acted on by an electric field lower than that acting on nonlinear resistance film 6. Accordingly, if nonlinear resistance film 9 is equal in thickness to nonlinear resistance film 6, nonlinear resistance film 9 may be acted on by an electric field lower than the critical value and may not be reduced in volume resistivity. Accordingly, nonlinear resistance film 9 is reduced in thinness to be smaller in thickness than nonlinear resistance film 6 so that the critical value of the electric field for which nonlinear resistance film 9 decreases in volume resistivity is lower than the electric field acting on nonlinear resistance film 9.

The above configuration can prevent a partial electric discharge from arising between metallic particle 7 deposited on the bottom of metal enclosure 2 and metal enclosure 2. More specifically, when an electric field concentration occurs at the tip of metallic particle 7 that is closer to metal enclosure 2, nonlinear resistance film 9 is acted on by an electric field higher than the critical value, and nonlinear resistance film 9 is thus decreased in volume resistivity. As a result, the electric field concentrating at the tip of metallic particle 7 that is closer to metal enclosure 2 can be alleviated, and a partial electric discharge that would otherwise arise between metal enclosure 2 and metallic particle 7 can thus be prevented.

This can reduce an electric charge supplied from metal enclosure 2 to metallic particle 7. As has been previously discussed, when metallic particle 7 is electrically charged in a large amount, metallic particle 7 can ascend close to or come in contact with conductor 3. Reducing the electric charge that is supplied from metal enclosure 2 to metallic particle 7 to thus less electrically charge metallic particle 7 allows metallic particle 7 to only ascend to a limited level to prevent metallic particle 7 from approaching conductor 3. Thus the present embodiment can prevent conductor 3 and metallic particle 7 from having a partial electric discharge therebetween causing flashover and can thus provide gas insulated electrical equipment 20 achieving more reliable insulation.

The present invention in a third embodiment provides gas insulated electrical equipment, as will be described hereinafter with reference to the figures. Note that the present embodiment provides gas insulated electrical equipment that differs from gas insulated electrical equipment 10 of the first embodiment only in that the former has a conductor disposed horizontally and vertically, and the gas insulated electrical equipment of the present embodiment will not be described for the remainder in configuration.

Third Embodiment

Figure 12:
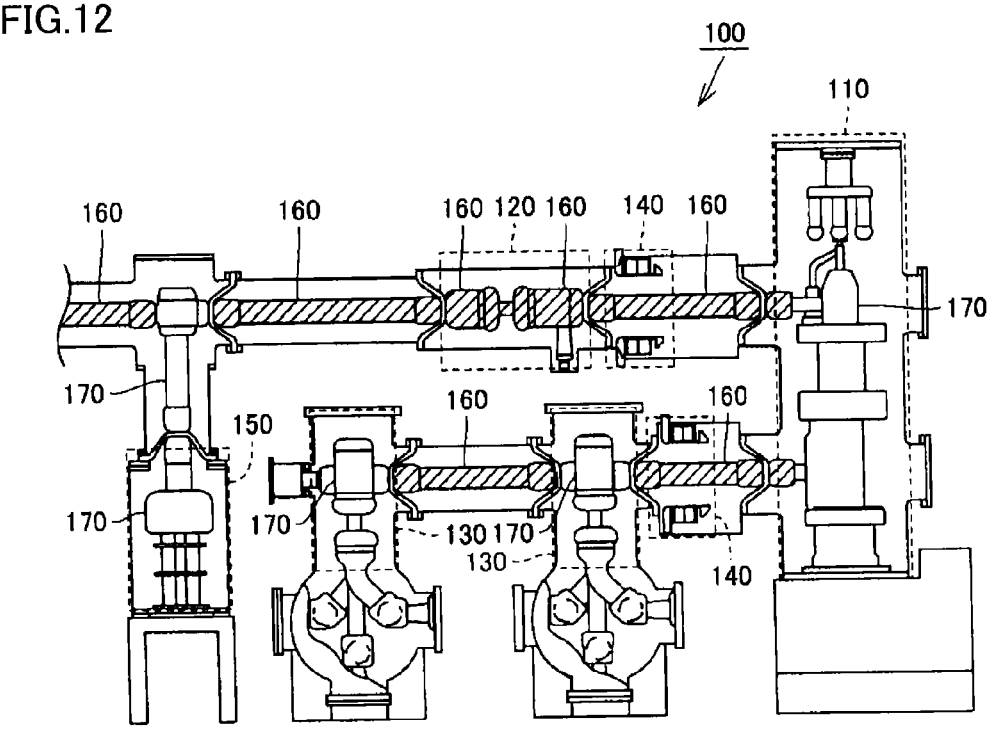
FIG. 12 is a cross section in configuration of gas insulated electrical equipment according to a third embodiment of the present invention, that is a gas insulated switchgear.

FIG. 12 is a cross section in configuration of gas insulated electrical equipment according to the third embodiment of the present invention that is a gas insulated switchgear. As shown in FIG. 12, the present invention in the third embodiment provides gas insulated electrical equipment that is a gas insulated switchgear 100 including a circuit breaker 110, disconnecting switches 120, 130, a current transformer 140, a metering potential transformer 150, and a bus (or conductor) connecting them. Gas insulated switchgear 100 also includes a lightning arrester, a bushing, a cable head, and the like (not shown).

The present embodiment provides gas insulated switchgear 100 having components disposed horizontally as well as vertically to save space. In the present embodiment, circuit breaker 110 and disconnecting switch 130 are disposed vertically. Accordingly, the bus (or conductor) connecting these components to one another includes a horizontally disposed horizontal portion 160 (a horizontally disposed conductor) and a vertically disposed vertical portion 170 (a perpendicularly disposed conductor). FIG. 12 shows the conductor with horizontal portion 160 hatched.

In the metal enclosure a metallic particle behaves as determined by a balance between the Coulomb force acting on the electric charge that the metallic particle has and gravity. Vertically disposed circuit breaker 110 and disconnecting switch 130, and vertical portion 170 are significantly affected by gravity and there is not observed a metallic particle reciprocating between the metal enclosure and the conductor. In other words, the metallic particle deposits on a lower portion of the metal enclosure. Accordingly, for the vertically disposed components, there is little necessity of taking measures against the flashover attributed to the metallic particle.

Accordingly, the present embodiment provides gas insulated switchgear 100 to have a dielectric film and a nonlinear resistance film to surround the conductor's external circumference only at horizontal portion 160. Note that, similarly, the dielectric film and the nonlinear resistance film may be provided on the metal enclosure's internal circumference only at the horizontal portion.

This can prevent a metallic particle in the metal enclosure from causing flashover and thus allows gas insulated switchgear 100 to achieve more reliable insulation. Furthermore, the present gas insulated switchgear can be produced through a process simpler than gas insulated switchgear 100 with any conductor provided with dielectric film and nonlinear resistance film is. The present embodiment can thus provide gas insulated switchgear 100 that can be easily produced and minimize an electric discharge that is caused by a metallic particle to achieve more reliable insulation.

It should be understood that the embodiments disclosed herein are illustrative and non-restrictive in any respect. Accordingly the scope of the present invention is not construed only through the above embodiments; rather, it is defined by the claims. Furthermore, it also encompasses any modifications within the scope and meaning equivalent to the terms of the claims.

REFERENCE SIGNS LIST

1: insulating gas; 2: metal enclosure; 3, 11, 12: conductor; 4: insulating and supporting member; 5: dielectric film; 6, 9: nonlinear resistance film; 7: metallic particle; 10, 20: gas insulated electrical equipment; 100: gas insulated switchgear; 110: circuit breaker; 120,130: disconnecting switch; 140: current transformer; 150: metering potential transformer; 160: horizontal portion; 170: vertical portion.

The invention claimed is:

1. Gas insulated electrical equipment comprising:
   a metal enclosure having an insulating gas introduced therein;
   a conductor that is accommodated inside said metal enclosure and to which voltage is applied; and
   an insulating and supporting member insulating and supporting said conductor relative to said metal enclosure, said conductor having a circumferential surface on which is provided a dielectric film, and a nonlinear resistance film provided on said dielectric film and having a nonlinear volume resistivity decreasing when said nonlinear resistance film is acted on by an electric field higher than a critical value.

2. The gas insulated electrical equipment according to claim 1, wherein said nonlinear resistance film is smaller in thickness than said dielectric film, and said nonlinear resistance film has a dimension in thickness smaller than a distance from an internal surface of said metal enclosure to a surface of said nonlinear resistance film.

3. The gas insulated electrical equipment according to claim 1, wherein said nonlinear resistance film is provided to be constant in volume resistivity in an electric field equal to or lower than a testing electric field and decrease in volume resistivity in an electric field higher than said testing electric field, said testing electric field being an electric field acting on said nonlinear resistance film when a test voltage is applied to confirm whether said metal enclosure has any metallic particle therein.

4. The gas insulated electrical equipment according to claim 1, wherein:
   said nonlinear resistance film is formed of a binder resin used for providing said film, and a nonlinear resistance material; and
   said binder resin has a major component identical to that of said dielectric film.

5. The gas insulated electrical equipment according to claim 1, wherein said metal enclosure has an inner circumference covered with a dielectric film and a nonlinear resistance film provided on said dielectric film and having a nonlinear volume resistivity decreasing when said nonlinear resistance film is acted on by an electric field higher than a critical value.

6. The gas insulated electrical equipment according to claim 1, wherein:
   said conductor includes a horizontally disposed horizontal portion and a vertically disposed vertical portion; and
   said dielectric film and said nonlinear resistance film are provided on said conductor only at said horizontal portion.

* * * * *